S. D. RADER.

Brick-Kiln.

No. 6,380.

Reissued April 13, 1875.

WITNESSES

E. H. Bates

Geo. E. Upham.

ASSIGNEE.

Edwin V. Wingard,

Chipman Fromer & Co.

ATTORNEYS

THE GRAPHIC CO. PHOTO-LITH. 39 & 41 PARK PLACE, N.Y.

UNITED STATES PATENT OFFICE.

STEPHEN D. RADER, OF WILLIAMSPORT, ASSIGNOR, BY MESNE ASSIGNMENTS, TO EDWIN V. WINGARD, OF PHILADELPHIA, PENNSYLVANIA.

IMPROVEMENT IN BRICK-KILNS.

Specification forming part of Letters Patent No. 65,943, dated June 18, 1867; reissue No. 6,380, dated April 13, 1875; application filed March 27, 1875.

*To all whom it may concern:*

Be it known that STEPHEN D. RADER, of Williamsport, Pennsylvania, did invent certain new and useful Improvements in Brick-Kilns, of which the following is a specification; and that I, EDWIN V. WINGARD, of Philadelphia, Pennsylvania, am now sole owner thereof.

Figure 1:
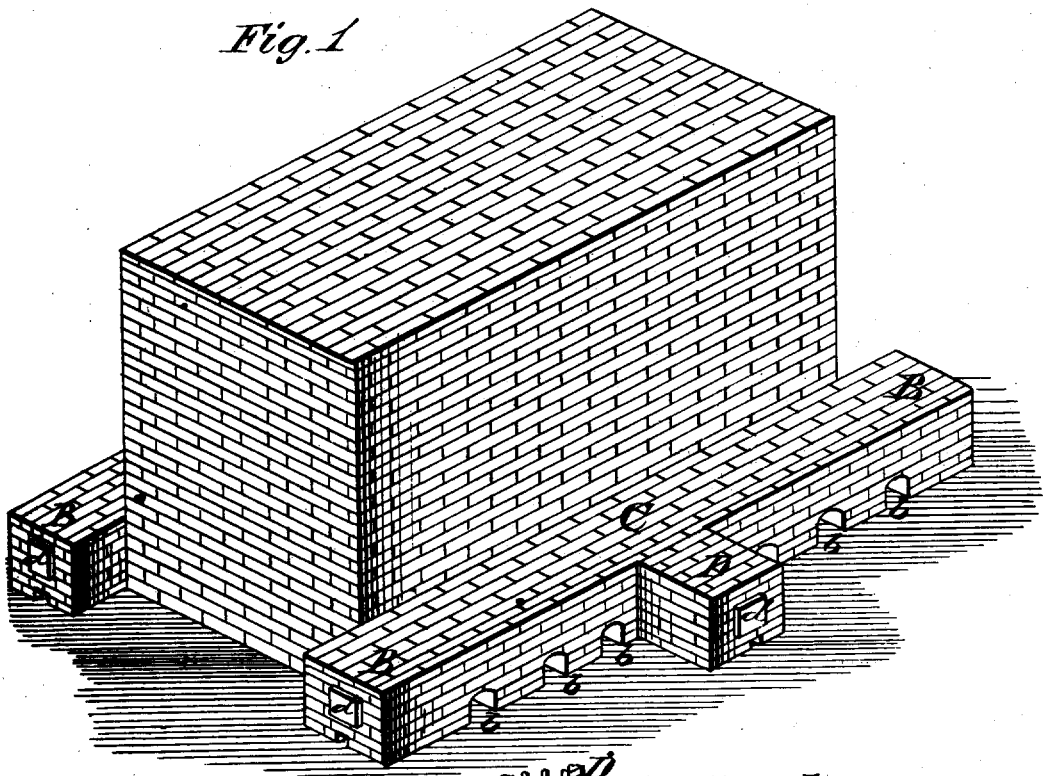
Figure 1:
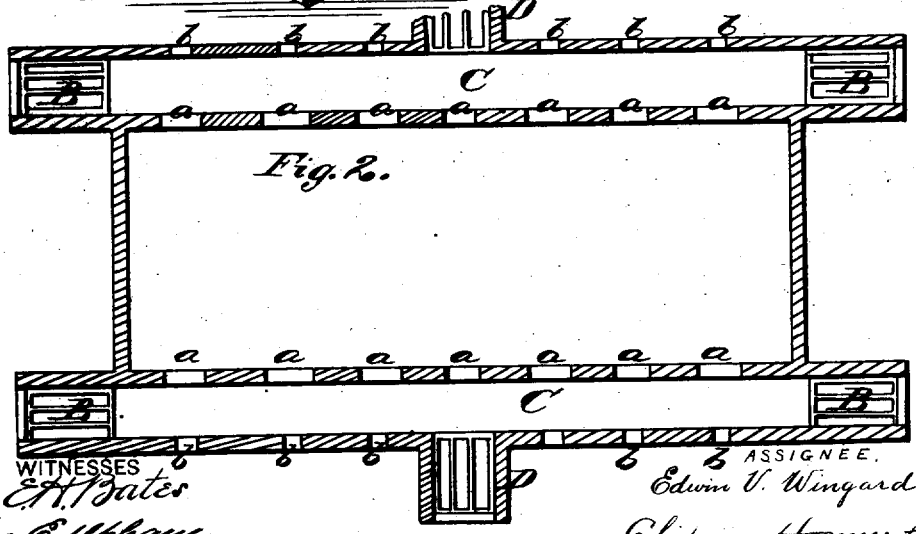

Figure 1 is a perspective view of the kiln, and Fig. 2 is a sectional view of the same.

This invention has relation to kilns for burning bricks and other objects made of clay; and it consists in a method or process of mixing air and inflammable gases before allowing them to come in contact with the green ware in the kiln, whereby a steady equalized temperature in the kiln will be obtained with an economy of fuel, and the ware will be evenly burned.

Before the improvement hereinafter explained, the walls of kilns, whether provided with furnaces or not, were so constructed that the air-drafts were directly into the body of the kilns, and no adequate provision was made for utilizing this air in the combustion of the gases from the fuel. Nor was any provision made for regulating and rendering uniform the temperature in the kilns—hence the well-known damaging effect to the wares burned in the lower part of the kilns.

The improved kiln may be made in the usual way, with openings *a* leading through its walls at their bottoms. These openings in ordinary kilns have been used as furnaces for receiving the fuel and generating the necessary degree of heat for burning the material in the kiln to a proper degree of hardness. As it is impossible, by this mode of firing kilns, to diffuse the heat evenly throughout every portion of the mass, the consequence will be that some of the material will be burned too much; while another portion will be burned too little. To avoid this difficulty I construct chambers C C on the sides of the furnace-walls, the ends of which extend out beyond the ends of said walls, and are grated, as shown in Fig. 3, to form furnaces B B. In addition to the end furnaces, I may construct intermediate furnaces D, which latter will increase the volume of heated air introduced into the chambers C.

The chambers C C have a series of openings, *b*, through their front walls, corresponding in position to the passages *a*, leading into the kiln, but smaller than these passages. The object of the openings *b* is to introduce currents of air into the chambers C C, which air will mix with the heated gases therein and maintain a lively combustion. The openings *b* also afford a draft for driving the flame into the kiln through the passages *a*. The furnaces are provided with doors *d*, which can be shut after the fires are made, as the openings *b* will supply air to maintain combustion.

The advantages which are claimed for the kiln above described are, saving of time in burning, and a saving of fuel, by reason of the perfect combustion of the gaseous products in the chambers C C. Another advantage is, the equalization of the heat throughout the kiln, thereby producing brick of uniform hardness, and superior in quality to those burned in the ordinary manner.

What I claim as new, and desire to secure by Letters Patent, is—

1. The combination, with the kiln A, of the furnace B and the air-combustion chamber C, arranged substantially as specified.

2. A combustion-chamber, C, provided with passages *a*, leading into the burning-chamber of the kiln, in combination with a furnace, substantially as described.

3. A combustion-chamber, C, provided with air inlets and passages *a*, in combination with a furnace, substantially as described.

In testimony that I claim the above I have hereunto subscribed my name in the presence of two witnesses.

EDWIN V. WINGARD.

Attest:

GEORGE E. UPHAM,
JOHN B. CORLISS.